United States Patent [19]

Huret

[11] 4,403,978
[45] Sep. 13, 1983

[54] DERAILLEUR FOR A CYCLE

[75] Inventor: Roger H. M. Huret, Nanterre, France

[73] Assignee: Establissements Huret & Fils, Nanterre, France

[21] Appl. No.: 196,515

[22] Filed: Oct. 14, 1980

[30] Foreign Application Priority Data

Oct. 5, 1979 [FR] France .................. 79 24903

[51] Int. Cl.³ ............ F16H 11/00; B60G 13/00
[52] U.S. Cl. .................... 474/82; 267/58; 267/155
[58] Field of Search ............ 474/82; 267/155, 156, 267/58, 157, 167, 174, 55, 61 R, 62

[56] References Cited

U.S. PATENT DOCUMENTS

| 2,577,964 | 12/1951 | Heuer | 267/58 |
| 4,002,080 | 1/1977 | Huret et al. | 474/82 |
| 4,226,131 | 10/1980 | Yamasaki | 474/82 |
| 4,285,676 | 8/1981 | Kraft | 267/155 |
| 4,306,871 | 12/1981 | Nagano | 474/82 |
| 4,350,055 | 9/1982 | Pinomäki | 267/155 |

Primary Examiner—Lawrence J. Staab
Assistant Examiner—Andrew J. Rudy
Attorney, Agent, or Firm—Seidel, Gonda & Goldhammer

[57] ABSTRACT

This invention concerns a derailleur for a cycle, comprising a yoke provided with a chain-guide pinion and a chain-tensioning pinion 3 Claims, 3 Drawing Figures U.S. Patent  Sep. 13, 1983  4,403,978
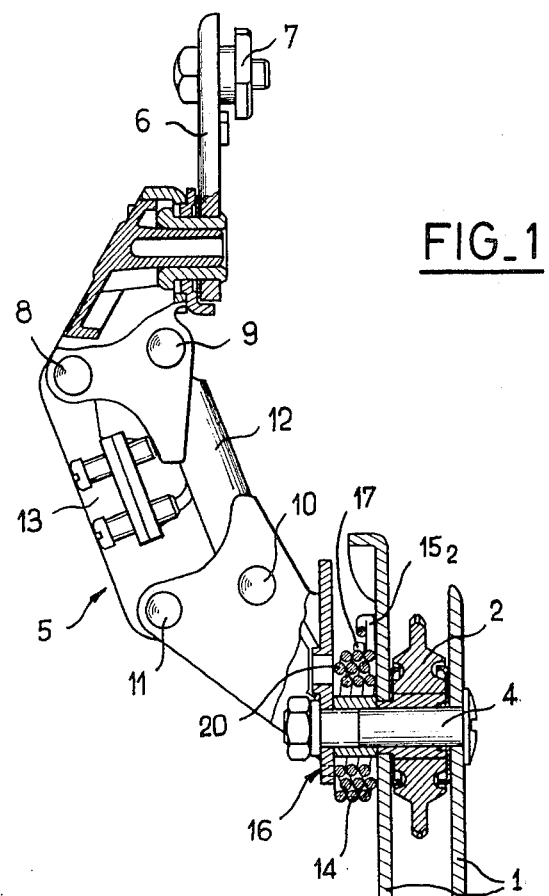
FIG_1
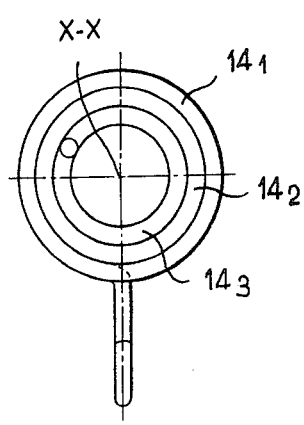
FIG_2
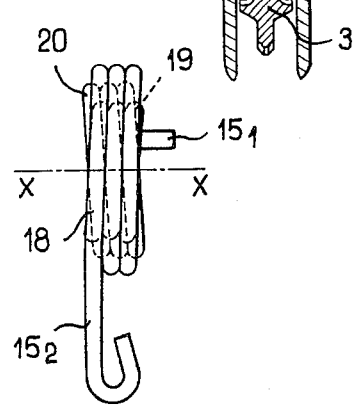
FIG_3

DERAILLEUR FOR A CYCLE

The invention relates to a dérailleur for a cycle.

Dérailleurs are already known in which the yoke, provided with the chain-guide pinion and with the chain-tensioning pinion, is pivotally mounted in opposition to a coil-type adjusting spring on a support ensuring the translational movement of the yoke and thus of the chain.

Originally this spring comprised a single cylindrical coil of several convolutions of wire, the ends of this spring situated at the ends of the coil being directly connected, on the one hand, to the yoke and, on the other hand, to the support.

However, this spring, which is arranged about the pivot axis of the yoke, had to be short in length, firstly for space reasons, since the greater the length of the spring the more the yoke support has to extend laterally the width of the cycle, secondly for reasons of stability in respect of the yoke, since the greater the length of the spring the more the pivot axis of the yoke has to be lengthened, which results in an increase in the angular deflection of the yoke, taking into account the inevitable play.

Accordingly, it has been proposed to design this spring so that the metal wire forms two coaxial coils arranged one above the other and this solution made it possible, taking into account the increase in the number of convolutions of the spring, to increase the progressiveness of its elasticity when the yoke pivots between its end positions; these end positions, moreover, being determined by the difference in diameter between the smallest and largest freewheel sprocket of the cycle.

However, it has been found that this design entails serious disadvantages in the operation of the dérailleur, causing its operation to be unreliable.

In fact, the two ends of this spring with two coils are necessarily positioned on the same side so that, when the spring is compressed (the chain being positioned on the sprocket of largest diameter), the convolution of the outer coil adjacent one of the ends of the spring can, in certain circumstances, become wedged between the two adjoining convolutions of the inner coil, which are adjacent the other end of the spring.

This is caused by the fact that, when the spring is compressed, the last convolution of the outer coil (which is connected to the pivoting yoke) is deformed the most by reduction in its diameter whereas, on the contrary, the last convolutions of the inner coil (connected to the fixed support), which are arranged face to face, are only slightly deformed.

Therefore, the compression of the spring may cause interpenetration of the end convolutions, thus resulting in elimination of the elastic pull-back of the yoke and faulty operation of the dérailleur, above all during the movement of the chain from a large sprocket to a small sprocket of the freewheel.

This wedging or catching is generally only momentary but it is sufficient, particularly during the movement of the chain from a large sprocket to a small sprocket, to allow slipping of this chain, in view of the elimination of elastic pull-back.

It should also be noted that this possibility of wedging increases progressively with the use of the dérailleur, since the end convolution of the outer coil, which is compressed the most, is likewise the convolution which is most subject to ageing, deforming and weakening.

Moreover, at present it is a tendency for cycles to have an increasing number of freewheel sprockets and for the difference in diameter between these sprockets to be increased, which results in an increase in the angle through which the yoke has to pivot so as to keep the chain under tension and, therefore, results in an increase in the compression of the spring and thus a more substantial decrease in the diameter of the end convolution of the outer coil.

The present invention has, in particular, the object of eliminating these disadvantages and, accordingly, relates to a dérailleur for a cycle, comprising a yoke provided with a chain-guide pinion and with a chain-tensioning pinion, said yoke being pivotally mounted by means of a pivot on a support provided, on the one hand, with means for its attachment to the fork lug or tongue of a cycle, on the other hand, with means which enable the yoke to undergo translational movement, a coil-type adjusting spring being additionally arranged around the pivot between the yoke and its support; which dérailleur is characterised in that this coil spring comprises a single metal wire forming several cylindrical coils, uneven in number, each consisting of several convolutions of wire and arranged coaxially one around the other.

The invention is illustrated non-restrictively by way of example in the accompanying drawings, in which:

FIG. 1 is a side view of a dérailleur according to the invention;

FIG. 2 is a view in elevation of the adjusting spring for the yoke of the derailleur in FIG. 1;

FIG. 3 is a view from the left of FIG. 2.

Accordingly, the present invention has the object of devising a dérailleur which is safe in operation and has good reliability, avoiding in particular the dangers of wedging and deformation of the convolutions of the adjusting spring for the yoke.

In the example illustrated in FIG. 1, the dérailleur comprises a yoke 1 which supports between its arms the chain-guide pinion 2 and the chain-tensioning pinion 3, said yoke 1 being pivotally mounted about a pivot 4 fastened to the support 5 intended to be secured by means of a lug 6 and a clamping screw or nut 7 on the lug of the rear fork of the bicycle.

In the illustrated example, the support 5 constitutes a deformable parallelogram defined by the articulation pins 8, 9, 10 and 11 and whose two parallel arms 12 and 13 ensure the translational movement of the pivot 4 and, therefore, of the yoke 1.

This yoke pivots about the pivot 4 in relation to the support 5 in opposition to an adjusting spring 14 intended to adjust the chain to the difference in diameter of the sprockets which can be used for the freewheel of the cycle.

According to the invention, this spring 14 is a coil-type spring consisting of a single metal wire forming three cylindrical coils $14_1$, $14_2$ and $14_3$ each comprising several convolutions of wire and arranged coaxially one about the other and around the pivot 4.

The ends of this spring are thus formed, on the one hand, by $15_1$ on one of the side faces of the spring and at the end of the inner coil $14_3$ and, on the other hand, by $15_2$ on the other side face and at the end of the outer coil $14_1$.

The end $15_1$, which is arranged parallel to the axis X—X of the spring, is fitted in a hole 16 in the support 5 and is thus rigidly located, whereas the end $15_2$, which is radial relative to the axis X—X of the spring, is simply hooked on to a lug 17 of the yoke 1 so as to be able to slide freely during the compression of the spring and, therefore, during a reduction in the diameter of its convolutions.

As a result of this construction of the adjusting spring 14 by means of three cylindrical coils which are coaxial and superposed one upon the other, the end convolution 18 of the outer coil $14_1$ is not situated facing the end convolutions 19 of the inner coil $14_3$ terminating in the engagement finger $15_1$, but is situated, on the contrary, facing the convolution 20 of the intermediate coil $14_2$, this coil not being fixed directly and rigidly either to the yoke 1 or to the support 5 and thus being able to deform freely during the compression of the spring.

Accordingly, because this convolution 20 is situated at two thirds of the length of the spring, starting from the end $15_2$, its deformation by reduction in diameter will be equal to a third of the reduction in diameter of the outer convolution 18 facing it and in the same direction, thereby decreasing the possibility of wedging of the convolutions, on the one hand, because of this reduction in diameter in the same direction and, on the other hand, because of the capacity for radial displacement of this convolution.

The yoke of the dérailleur according to the invention is thus able to pivot through a substantial angle, for example 180°, so as to maintain the progressive chain tension.

Similarly, because of this design it is possible for the coils $14_1$, $14_2$ and $14_3$ of the spring to be arranged closer to one another so that, if necessary, they react one against the other to maintain their coaxiality, i.e. so as to prevent, after a certain period of use, one of the coils being positioned obliquely relative to the others.

I claim:

1. Derailleur for a cycle comprising a yoke provided with a chain-guide pinion and a chain-tensioning pinion, said yoke being pivotably mounted by means of a pivot on a support, said support being provided with means for attachment to the fork lug of a cycle and with means enabling the yoke to undergo translational movement, a coil-type adjusting spring arranged around the pivot between the yoke and its support, said coil-type spring comprising a single metal wire forming sets of cylindrical coils uneven in number and arranged coaxially one around the other, each set of coils having several convolutions of said wire.

2. Derailleur in accordance with claim 1 wherein said spring comprises three sets of coils.

3. Derailleur according to claim 1 wherein the wire free ends extend from opposite faces of said spring, one free end extending generally parallel to the axis of said coils, the other free end extending radially with respect to said coils.

* * * * *